United States Patent [19]

Schneeberger

[11] Patent Number: 5,704,047
[45] Date of Patent: Dec. 30, 1997

[54] ATM COMMUNICATION SYSTEM WHEREIN UPSTREAM SWITCHING ELEMENT STOPS THE TRANSMISSION OF MESSAGE FOR A PREDETERMINED PERIOD OF TIME UPON BACKPRESSURE SIGNAL

[75] Inventor: Stefan Schneeberger, Vaterstetten, Germany

[73] Assignee: Siemens Aktiengesellschaft, Munich, Germany

[21] Appl. No.: 531,008

[22] Filed: Sep. 20, 1995

[30] Foreign Application Priority Data

Sep. 28, 1994 [EP] European Pat. Off. ............ 94115289

[51] Int. Cl.$^6$ .................................................. G06G 13/14
[52] U.S. Cl. .................... 395/200.65; 395/200.43; 395/200; 395/62; 370/229; 370/236
[58] Field of Search ........................ 370/229, 413, 370/412, 232, 253, 236; 395/200.65, 200.43, 200.62

[56] References Cited

U.S. PATENT DOCUMENTS

| | | | |
|---|---|---|---|
| 5,341,376 | 8/1994 | Yamashita | 370/466 |
| 5,377,327 | 12/1994 | Jain et al. | 395/200.15 |
| 5,434,848 | 7/1995 | Chimento, Jr. rt al. | 370/232 |
| 5,457,687 | 10/1995 | Newman | 370/232 |
| 5,475,692 | 12/1995 | Choudhury et al. | 370/229 |
| 5,519,689 | 5/1996 | Kim | 370/232 |
| 5,541,912 | 7/1996 | Choudhury et al. | 370/412 |
| 5,550,823 | 8/1996 | Ire et al. | 370/413 |
| 5,581,544 | 12/1996 | Hamada et al. | 370/253 |
| 5,629,928 | 5/1997 | Calvignac et al. | 370/237 |

FOREIGN PATENT DOCUMENTS 0471 256 A3   2/1992   European Pat. Off. .

OTHER PUBLICATIONS

Space Priority Management in a Shared Memory ATM Switch, Choudbury et al, AT&T Bell Laboratories,1993 IEEE 1375–1383.

IEEE Connference, Nov. 29–Dec. 2, 1993 vol. 3 of 4.

H. Anderson, Jr. et al. (IBM Technical Bulletin, vol. 25, No. 1, Jun. 1982) Flow–Balancing Congestion Control For Computer Networks.

*Primary Examiner*—Thomas C. Lee
*Assistant Examiner*—Ki S. Kim
*Attorney, Agent, or Firm*—Hill,Steadman & Simpson

[57] ABSTRACT

An ATM communication system for statistical multiplexing of message cells has a plurality of upstream interfaces, at least one multistage funnel of switching elements connected thereto, and at least one downstream interface. Each of the switching elements comprises a plurality of inputs and at least one output to which a logical queue is associated. The logical queue of each of the switching elements is common for different traffic classes. For the filling of the logical queues to each of the traffic classes, a predetermined threshold is defined. In case of exceeding the threshold for the respective traffic class by receiving a message cell for this traffic class, a back pressure signal is transmitted only to the switching element or upstream interface, respectively, just transmitting this message cell. The transmission of message cells is stopped by this switching element or upstream interface, respectively, for a predetermined period of time periodically until a resetting of the back pressure signal.

4 Claims, 2 Drawing Sheets

ATM COMMUNICATION SYSTEM WHEREIN UPSTREAM SWITCHING ELEMENT STOPS THE TRANSMISSION OF MESSAGE FOR A PREDETERMINED PERIOD OF TIME UPON BACKPRESSURE SIGNAL

BACKGROUND OF THE INVENTION

The present invention relates to an ATM-communication system for statistical multiplexing of message cells belonging to virtual connections of at least two different traffic classes according to an asynchronous transfer mode.

A general system architecture for an ATM Concentrator/ Switch (designated hereafter as "system") is based on the use of large buffers (for example several megabytes) as illustrated in FIG. 1. This architecture includes ATM Multiplexers (AMX), Statistical Multiplexing Units (SMUs) with large input and output buffers, and a high speed ATM Switching Network (ASN).

The AMXes are responsible for concentrating a group of input lines onto a higher speed trunk and conversely distributing cells from a high speed output trunk to a number of outgoing lines. The SMU on the input side (upstream SMU) contains a large shared memory buffer which is split into separate logical queues, one for each SMU on the output side. The ASN switches cells to the correct high speed ASN port which is attached to an output side SMU. The output side SMU (downstream SMU) has a large shared buffer which can be divided into an umber of logical queues (one per output port of the AMX). These queues will insure that the outgoing line is not overloaded. More complicated functionality may also be added to provide an egress traffic shaping capability on a per VCC basis.

A system with large buffers allows a high level of statistical multiplexing gain for burst traffic with moderate delay requirements (not real time) and high peak bit rates. Burst level congestion is effectively avoided by buffering the bursts and fairly sharing the available bandwidth between active connections.

SUMMARY OF THE INVENTION

According to the invention, an ATM communication system is provided for statistical multiplexing of message cells belonging to virtual connections of at least two different traffic classes according to an asynchronous transfer mode. A plurality of upstream interfaces is provided in each case with an output to which at least one logical queue is connected. At least one multi-stage funnel of switching elements is connected to the plurality of upstream interfaces and at least one downstream interface is connected to a last switching element of the respective funnel. Each of the switching elements comprises a plurality of inputs and at least one output to which a logical queue is associated. The logical queue of each of the switching elements is common for the different traffic classes. Means is provided for defining a predetermined threshold for filling of the logical queue of the respective switching element for each of the traffic classes. In case of exceeding the threshold for the respective traffic class by receiving a message cell for this traffic class, a back pressure mechanism is provided for transmitting a back pressure signal by the respective switching element only to the switching element or upstream interface, respectively, just transmitting this message cell. The switching element or upstream interface, respectively, just receiving the back pressure signal stops the transmission of message cells for a predetermined period of time periodically until resetting the back pressure signal.

This ATM communication system uses stop/go signals for transmission of message cells based on thresholds in the queues of switching elements (Ses) located in at least one funnel of switching elements. When the contents of a queue in the switching elements exceeds a predefined threshold, a "receive not ready" signal is set and sent to the unit which had sent a cell being buffered behind the threshold of the respective queue and traffic class.

The sending queue stops the transmission for a time-out period and than the server can start again. This operation with a suitable length for the time-out period insures that no cell will be lost in the ATM communication system.

The above and other objects, features and advantages of the present invention will become more apparent from the following detailed description taken with the accompanying drawings.

DESCRIPTION OF THE PREFERRED EMBODIMENTS

The general system architecture for an ATM communication system was described before. In this ATM communication system the logical input queues in the upstream statistical multiplex units SMU have subqueues for each traffic class and are served in a modified Round Robin Strategy, which takes care of the time priorities of cells of the different traffic classes. his means that cells of non-real time traffic are only transmitted from the statistical multiplex units SMU to the switching network ASN if no cell of real time traffic is waiting in the upstream statistical multiplex units SMU.

The logical output queues in the downstream statistical multiplex units SMU have subqueues for each traffic class and the subqueues are served with time priority for the cells of the real time traffic.

Figure 1:
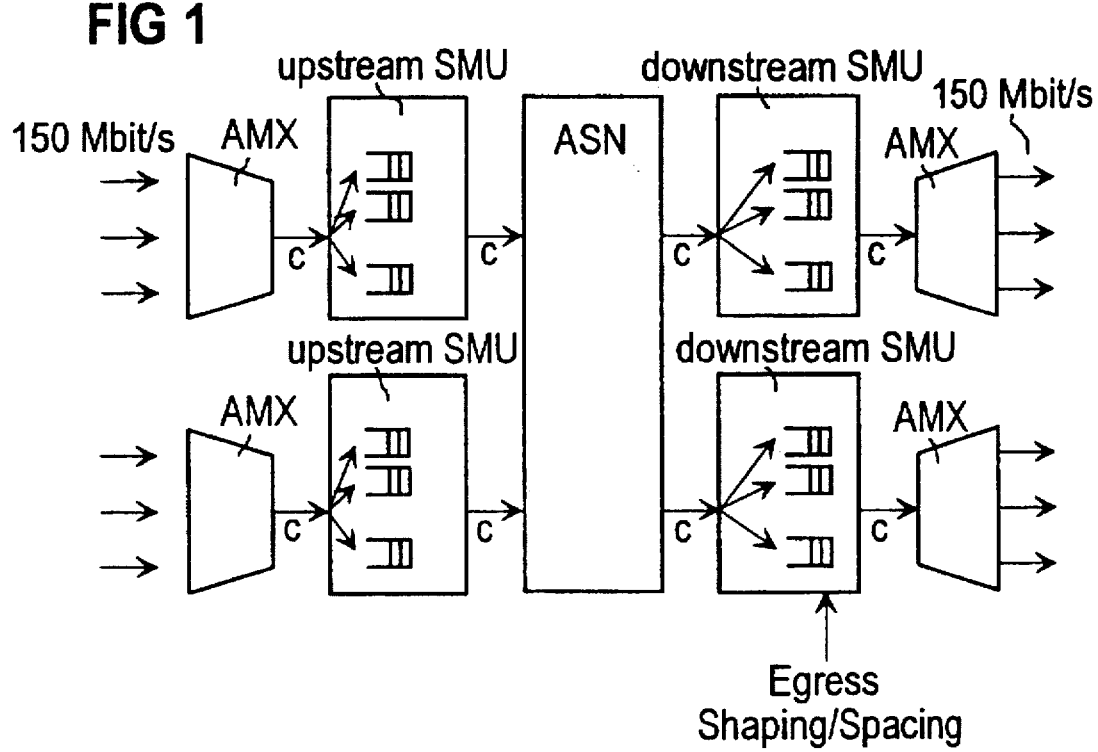
FIG. 1 shows a general system architecture for an ATM communication system in which the present invention is used.
Figure 2:
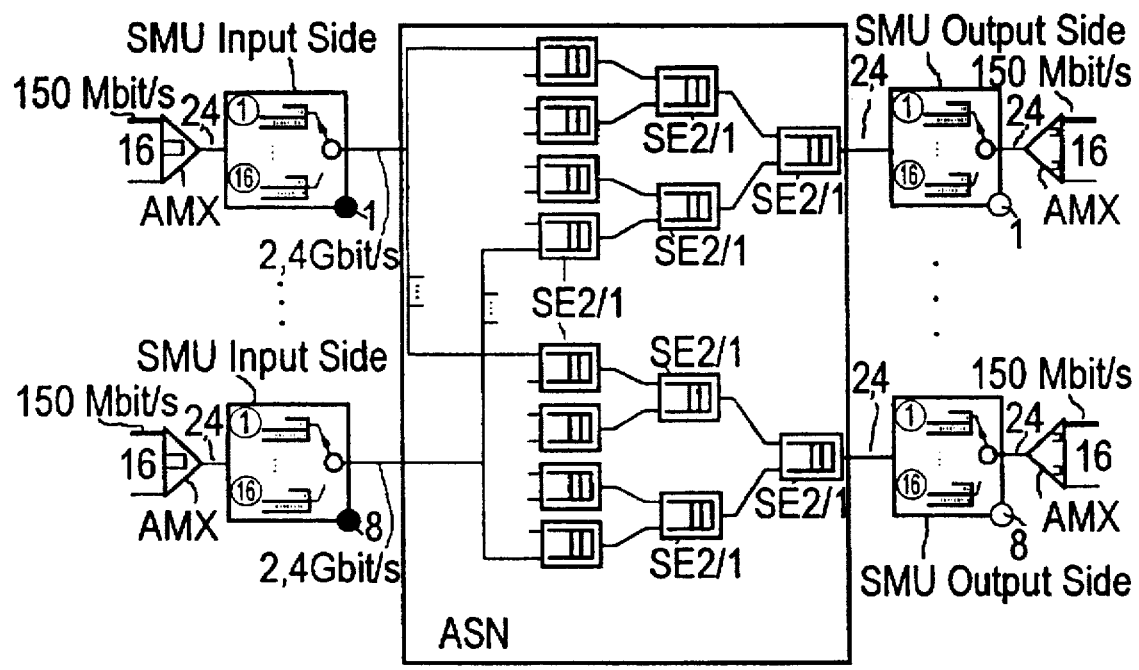
FIG. 2 shows an embodiment for an ATM communication system.

In the following, the system of FIG. 2 is considered. For example, this system may be designed for transmitting message cells of virtual connections with a bit rate up to 2.4 Gbit/s. These virtual connections are associated to different traffic classes. The ATM switching network ASN of this system is a multistage network and comprises in the different stages switching elements SE which have in each case one common queue for real time and non-real time traffic. There are no delay priorities. All switching elements have a shared buffer which is organized using output queuing. In the following, the output queue for one output interface of a switching element SE or a statistical multiplex unit SMU is denoted as a logical queue.

The 2.4 Gbit/s system of FIG. 2 has 128 input/output trunks with 150 Mbit/s connected at upstream/downstream ATM multiplexer AMX. There are eight up- and downstream statistical multiplex units SMU connected in each case to one of the multiplexers and working on a data rate of 2.4 Gbit/s. The traffic of an upstream multiplexer AMX is transmitted to the upstream statistical multiplex units SMU with eight logical queues. the switching network ASN has a three stage funnel structure built out of switching elements in the form 2|1. Each downstream statistical multiplex unit SMU has 16 logical queues, one for each 150 Mbit/s link of the following downstream multiplexer AMX.

The switching elements SE for the 2.4 Gbit/s system of FIG. 2 have in each case two input interfaces and one output interface and one logical output queue. Each of the logical queues of the switching elements is served by one 2.4 Gbit/s link. Such a logical queue is a common queue for all delay classes, for example real time traffic and non-real time traffic, and overtaking of cells from different delay classes is not possible within the switching elements.

The aim of the back pressure mechanism of the present invention is to protect the short queues in the switching elements SE of the switching network ASN against cell loss. Back pressure means that a switching element SE sends a "receive not ready" signal when the content of its queue exceeds a predefined threshold T (specifying the congested queue) to the switching element SE or statistical multiplex unit SMU which had directly sent a cell to the congested logical queue for a time-out period. The switching element SE or statistical multiplex unit SMU which receives the signal will stop sending cells to the congested logical queue. The statistical multiplex units may continue to send cells to other uncongested queues.

Due to the funnel structure of the switching network ASN and the specific queue (one separate queue for each downstream statistical multiplex unit SMU) in the upstream statistical multiplex units SMU all cells which are waiting in the same logical queue of a statistical multiplex unit SMU or of a switching unit SE are destined to the same logical queue in the next stage of the system. Therefore, head of line blocking by using a back pressure mechanism is avoided.

Figure 3:
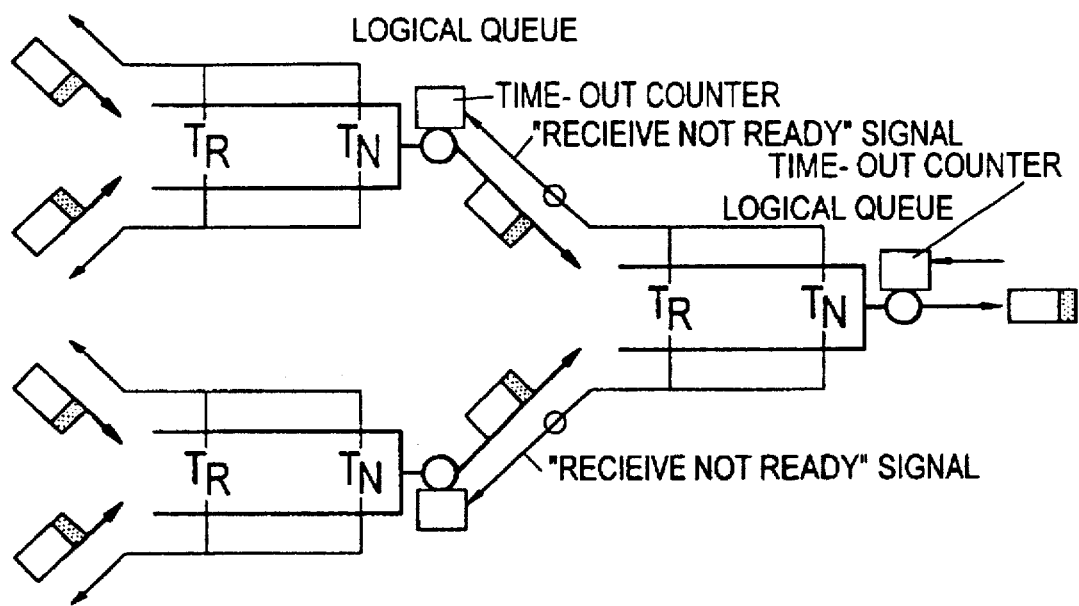
FIG. 3 shows the queuing concept for the switching elements of an ATM switching network shown in FIGS. 1 to 2.

For the back pressure mechanism there are thresholds T for the queue of a switching element SE which can be adjusted individually for each traffic class. In the present embodiment, two thresholds are defined, $T_N$ for the non-real time traffic and $T_R$ for the real time traffic with $T_N < T_R$. When an incoming cell has to be buffered and the threshold for the traffic class to which this cell belongs is exceeded, then the cell will be buffered, but via a back pressure signal "receive not ready", only the queue sending this ell is informed. Then only this sending queue stops the transmission of cells for a predefined number of cell cycles by means of a time-out counter. All other queues continue the transmission of cells until they get an individual "receive not ready" signal. This queuing concept is depicted in FIG. 3.

For each queue in the switching elements SE, the number of boolean back pressure signals needed for sending corresponds to the number of switching elements SE or upstream statistical multiplex units SMU which send cells directly to the queue. These back pressure signals are transmitted back to the switching elements SE or to the upstream statistical multiplex units SMU which send cells directly to that queue. To reach queue in the switching elements SE and in the upstream statistical multiplex unit SMU, one boolean signal for receiving the back pressure signal is needed.

For each queue in the switching elements SE and in the upstream statistical multiplex units SMU, the length of the time-out period can be adjusted individually (in number of cell cycles) by means of the time-out counter belonging thereto. When a queue of one of the switching elements SE or the statistical multiplex units SMU receives a back pressure signal "receive not ready" from the subsequent switching element SE, the respective queue stops the transmission of all cells for the adjusted number of cell cycles. In the time-out period of a queue in the statistical multiplex unit SMU, the statistical multiplex unit SMU can transmit cells from other queues belonging thereto which have not stopped for the transmission.

The time-out counter for the queues in the Ses is determined such that no more cells will enter the congested queue in the subsequent switching element SE than will leave the congested queue in the subsequent switching element SE within the time-out period. To determine the length of a time-out period for a queue, the queue has to assume that all other queues which are sending cells to the same congested queue will send a cell in each cell cycle. Therefore, each queue has to stop the transmission for so many cell cycles as there are other queues in the ASN funnel sending to the same congested queue in the last switching element SE of the ASN funnel. For the queues in the switching elements SE of the last stage in the switching network ASN, this means that the time-out period is zero, because there is no back pressure from the downstream statistical multiplex unit SMU back to the switching network ASN.

There is no cell loss in the switching network ASN for all traffic classes if the thresholds for the traffic class with highest priority (here $T_R$) in the queues of the Ses is chosen as the difference between the value of the queue capacity and the number of queues sending to the queue. the queuing delay of real time traffic cells will not increase too much if only a few cells of non-real time traffic will be buffered in the queues of the switching elements SE. This could be insured by choosing a very low threshold $T_N$ for non-real time traffic in all queues of the switching elements SE. But there is a lower boundary for the threshold $T_N$ so that the queue will not run empty after the reset of the back pressure signals.

Figure 4:
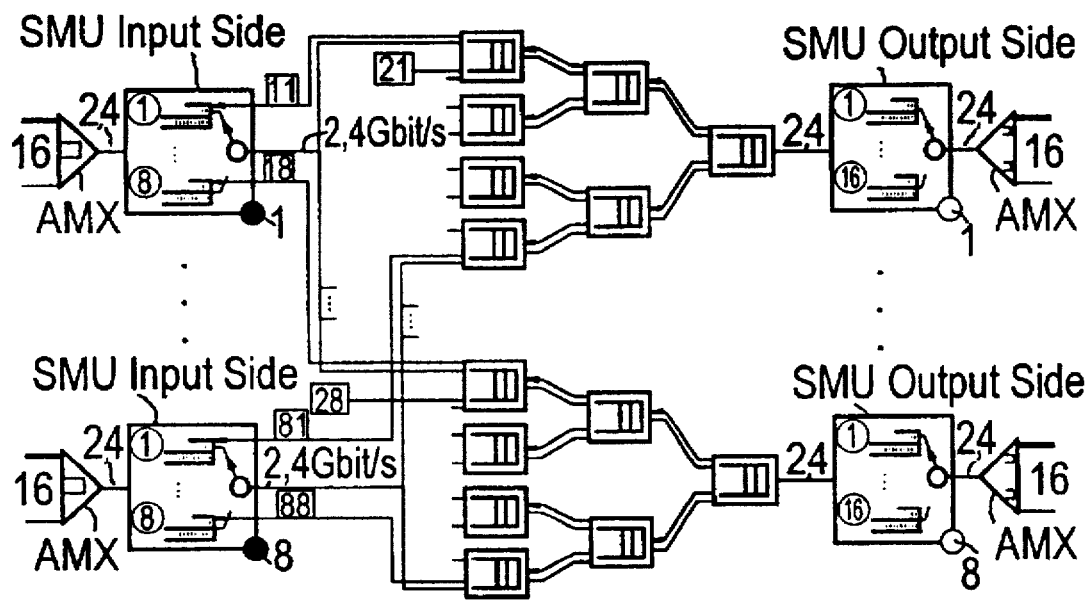
FIG. 4 shows the cabling for the queuing concept in the ATM communication system of FIG. 2.

In the following, the cabling concept shown in FIG. 4 for the transmission of the back pressure signals in the system according to FIG. 2 is considered.

In each switching element SE with the structure 2|1, there have to be one input and two outputs for the back pressure signals. Since there is a one to one relation between the logical queues in the statistical multiplex units SMU and the input interfaces of the switching elements SE in the first stage of the switching network ASN, it is possible to transmit the back pressure signals directly to the upstream statistical multiplex units SMU. Each statistical multiplex unit SMU needs eight inputs for receiving back pressure signals. In FIG. 4, only two of the eight upstream statistical multiplex units SMU and funnels in the switching network ASN are shown. For the truncated back pressure signals the number 21 (or 28) means that this is the pack pressure signal for the logical queue number 1 (or 8) in the second statistical multiplex unit SMU.

In the switching elements SE shown in FIG. 2 there are no dedicated queues to separate the service classes variable bit rate (VBR) traffic and available bit rate (ABR) traffic within the class of non-real time traffic. It is proposed to give VBR traffic time priority over the ABR traffic only in the queues of the upstream and the downstream statistical multiplex units SMU. Therefore, each logical queue in the statistical multiplex units SMU needs a third subqueue. For the ABR-traffic, only a third threshold $T_A$ with $T_A < T_N$ is required. Considering the case when the queue level is greater than $T_A$ but lower than $T_N$, and one queue is sending VBR-traffic and another queue is sending ABR-traffic. The "ABR-queue" receives a back pressure signal after each transmission of a cell and is stopping the transmission for its time-out period. The "VBR-queue" receives no back pressure signal and transmits a cell in each cell cycle. There is no additional back pressure signal needed for ABR-traffic.

In the foregoing, the present invention was described only as an example in connection with an ATM communication system according to FIG. 2. But the present invention is not restricted to this embodiment. Rather, it is generally useable in ATM communication systems comprising a plurality of upstream interfaces connected to at least one funnel of switching elements and at least one downstream interface connected to the last switching element of the respective funnel. The switching elements can have in each case the structure m/n, whereby m denotes the number of inputs and n the number of outputs of a switching element.

Although various minor changes and modifications might be proposed by those skilled in the art, it will be understood that I wish to include within the claims of the patent warranted hereon all such changes and modifications as reasonably come within my contribution to the art.

I claim as my invention:

1. An ATM communication system for a statistical multiplexing of message cells belonging to virtual connections of at least two different traffic classes according to an asynchronous transfer mode, comprising:

a plurality of upstream interfaces in each case with an output to which at least one logical queue is connected;

at least one multi-stage funnel of switching elements connected to said plurality of upstream interfaces and at least one downstream interface connected to a last switching element of the respective funnel, each of the switching elements comprising a plurality of inputs and at least one output to which a logical queue is associated;

the logical queue of each of the switching elements being common for the different traffic classes;

means for defining a predetermined threshold for filling of the logical queue of the respective switching element for each of the traffic classes;

in case of exceeding the threshold for the respective traffic class by receiving a message cell for this traffic class, a back pressure mechanism is provided for transmitting a back pressure signal by the respective switching element only to the switching element or upstream interface, respectively, just transmitting this message cell; and the switching element or upstream interface, respectively, just receiving the back pressure signal stopping transmission of message cells for a predetermined period of time periodically until resetting of the back pressure signal.

2. An ATM communication system according to claim 1, further comprising:

a plurality of funnels of switching elements connected at input sides in parallel to the plurality of upstream interfaces and at output sides in each case to a downstream interface;

the upstream interfaces comprising in each case a plurality of logical queues associated individually to one of the downstream interfaces; and the respective upstream interface for the switching element transmitting the back pressure signal being received only stopping the transmission of message cells.

3. An ATM communication system according to claim 1 wherein in each of the logical queues of the switching elements, means is provided for defining a first threshold for non-real time traffic and a second threshold for a real time traffic created in the first threshold.

4. A method for operating an ATM communication system for statistical multiplexing of message cells belonging to virtual connections of at least two different traffic classes according to an asynchronous transfer mode, a plurality of upstream interfaces being provided in each case, with an output to which at least one logical queue is connected, at least one multi-stage funnel of switching elements being connected to the plurality of upstream interfaces and at least one downstream interface being connected to a last switching element of the respective funnel, and each of the switching elements comprising a plurality of inputs and at least one output to which a logical queue is associated, and wherein the logical queue of each of the switching elements is common for the different traffic classes, comprising the steps of:

defining a predetermined threshold for filling of the logical queue of the respective switching element for each of the traffic classes;

in case of exceeding the threshold for the respective traffic class by receiving a message cell for this traffic class, transmitting a back pressure signal by the respective switching element only to the switching element or upstream interface, respectively, just transmitting this message cell; and by the switching element or upstream interface, respectively, just receiving the back pressure signal, stopping the transmission of message cells for a predetermined period of time periodically until resetting the back pressure signal.

* * * * *